United States Patent Office 2,967,178
Patented Jan. 3, 1961

2,967,178

METHOD OF PRODUCING GELLING STARCH OF HIGH CLARITY

Ralph W. Kerr, Riverside, Eugene F. Paschall, Orland Park, and William H. Minkema, La Grange, Ill., assignors to Corn Products Company, a corporation of Delaware No Drawing. Filed Dec. 6, 1957, Ser. No. 700,949

7 Claims. (Cl. 260—233.5)

This invention is concerned with the production of a clear, gelling agent, that is to say, a product which when dispersed in water and allowed to set, will form a moldable gel with a clarity approaching that of the better, well-known hydrogels, such as gelatin, pectin and refined agar.

It is an object of this invention to produce from cereal starches, such as corn starch, a product which when dispersed in water will set to a moldable gel that has clarity and texture similar to hydrogels formed from gelatin, pectin, refined agar and the like. A further object of this invention is to produce a novel starch product which may be used as the primary gelling agent in the production of such items as moldable, fruit-flavored gelled desserts, fruit-flavored jellies, gelled bouillon, moldable gelled salads, and the like. Yet another object of the invention is to provide a starch product which will form a clear, moldable gel having a gel clarity, as measured on a 1 percent aqueous paste of at least 90 percent light transmission (using pure water as the standard) and on a 3 percent paste of at least 80 to 85 percent light transmission and which has a gel strength of at least 100 grams per $\pi$ square centimeters when 40 grams is cooked in 280 ml. of water and cooled. Still a further object of this invention is to provide a process for producing the aforesaid novel starch product which employs only water as the liquid medium so that the starch may be reacted and the reacted product purified, as by washing, to the level demanded of a food ingredient, and at the same time, maintain a favorable differential in cost between the starch product and higher priced hydrogels, such as gelatin, pectin and refined agar. Other objects will be apparent from the description of the invention which follows.

Starch has been used as the gelling agent in a number of conventional applications, particularly in foods, for many years. For example, starch has been used to make the well-known type of corn starch pudding. Acid hydrolyzed corn starch has been used as the gelling agent in confections of characteristic properties, such as gum drops and jelly beans. Noncereal starches, such as potato and tapioca, while inherently poor gelling agents, have been acid treated, oxidized or chemically cross-linked, and then used to make soft, nonmoldable puddings, because of the fact that those products have better clarity and smoother texture than products made from conventional cereal starches. In no instance in the prior art, however, has a starch product been developed which at the same time possesses the high degree of clarity, the texture and the moldable gelling properties of the more costly gelling agents, such as gelatin, pectin, and purified agar. Corn starch, for example, produces an opaque, nonreversible gel. Some degree of clarity is obtained when corn starch is acid hydrolyzed to make the thin boiling starches of commerce for use in making gum drops and jelly beans, but this treatment results in a considerable loss in gelling power per unit weight and the development of a tough, chewy mixture. The noncereal starches have been employed in some applications because of their inherent high clarity, but these starches have extremely poor gelling power, and when they are treated chemically or physically by procedures well known in the art, to induce some gelling ability, clarity suffers and these weak gels are cloudy to opaque. Various chemical treatments, such as etherification and acylation, have been applied to cereal starches in particular. However, although clearity of paste is very materially improved by etherification or acylation, a pronounced characteristic of all starch derivatives known heretofore is that the ability of the starch product, after pasting, to set to a gel is substantially destroyed.

Obviously, therefore, the production of a starch product which, when heat gelatinized in water and cooled, would set to a clear, firm, moldable gel with a texture similar to gels made of gelatin, pectin, or agar would be a very significant advancement in hte art.

We have discovered a method whereby the aforesaid objects may be achieved and, at the same time, the defects of the prior art overcome. We have discovered that if starch is sulfated in a particular manner and acid modified, in any order, to a limited degree, we can obtain a starch product having both high gel clarity and high gel strength. The sulfation of the starch must be carried out in an aqueous medium using tertiary amine-sulfur trioxide compounds as the sulfating agent and in the presence of an alkaline catalyst. The degree of sulfation must be within the range of 0.02 to 0.10 D.S. and the extent of the acid modification as measured by gel strength and gel clarity should be within the range of 100–120 grams per $\pi$ sq. cm. for the former and for the latter 90 percent light transmission on a 1 percent aqueous paste (using pure water as the standard) and at least 80–85 percent light transmission on a 3 percent aqueous paste. It is desirable to avoid hydrolysis of the starch or starch sulfate during the acid modification and the fluidity value, as determined in accordance with the method described hereinafter, should not be permitted to go above about 10. Any appreciab'e hydrolysis of the starch before or after sulfation has a deleterious effect on applicants' products, i.e., destroys gel strength.

By the above outlined procedures, a starch product resulted which unexpectedly gave a sol of higher clarity for a given degree of substitution (D.S.) than any other type of starch derivative known heretofore. Furthermore, all starch derivatives known in the prior art show, without exception, as clarity of sol is increased with the extent of derivatization that the ability of the sol to set up to a gel is reduced proportionately. Our findings that a combination of sulfation and modifying treatment, as hereinafter described, gives a starch product that forms a sol in water with both unusually high clarity and exceptional gelling power was, therefore, a most unanticipated result.

The sulfation of starch, i.e., reaction with the tertiary amine sulfur trioxide, whether before or after the acid modification should be carried out under alkaline conditions, i.e., the pH should be maintained above 7 and preferably above 10. Any alkaline compound or compound producing alkali by hydrolysis or other chemical reaction may be used to catalyze the sulfation reaction and, also, to maintain the pH at the proper level during the reaction, e.g., alkali metal hydroxides, sodium phosphate, sodium carbonate and organic bases, such as quaternary ammonium bases and amines may be used. The rate of reaction increases with increased concentration of alkaline material. The amount of alkaline material may vary widely depending on the rate desired and also whether or not it is desired to prevent gelatinization of the starch during sulfation. For example, in the preparation of unswollen granule starch sulfate, as the concentration of sodium hydroxide is increased from 0.02 to 0.1 mole per mole of starch, using 0.05 mole of sulfating agent at 40° C., the rate of reaction is increased. Concentrations of sodium hydroxide greater than about 0.1 mole dispersed in a starch slurry consisting of one mole of starch and 220 ml. of water for any concentration of sulfating agent and at room temperature will cause the starch to gelatinize. Salts, such as sodium sulfate, potassium sulfate, sodium chloride, and the like, may be used to increase the gelatinization temperature of starch and thereby prevent swelling of starch granules during sulfation.

Sulfation of starch, or acid modified starch, with tertiary amine sulfur trioxide compounds proceeds readily at room temperature but the rate is increased by heating. The limiting condition for the preparation of ungelatinized starch sulfates is the gelatinization temperature of the product. Higher reaction temperatures may be used if the aforementioned salts are present to prevent gelatinization. Generally, 40° C. is satisfactory for the preparation of starch sulfate in ungelatinized form providing the concentration of alkali does not exceed about 0.1 mole NaOH in a starch slurry consisting of 1 mole of starch and 220 ml. of water. If gelatinized starches are to be sulfated or if the final ester is desired in gelatinized form, the temperature may be increased, the practical limit being that at which the ester begins to be hydrolyzed.

The time of the sulfation reaction may vary widely, depending on the concentration of alkaline substance, amount of sulfating agent, and temperature, and the desired end product.

The preferred tertiary amine sulfur trioxide compounds are the trimethylamine and triethylamine sulfur trioxides, although other trialkyl amines, such as dimethyl benzylamine, dimethyl ethylamine, diethyl methylamine, and tripropylamine also give satisfactory results. Diethylamine may also be used.

Among the cyclic and heterocyclic tertiary amine sulfur trioxide compounds which give hatisfactory results are N-ethylpiperidine, N-ethylmorpholine, dimethylcyclohexylamine, pyridine, and the like.

The acid treatment prior to or after sulfation to modify the product may be carried out on ungelatinized starch. For example, starch is suspended in dilute acid, such as hydrochloric or sulfuric between (0.1 to 0.2 N) and the suspension warmed while being agitated to about 45° C. to 55° C. until the desired level of gel clarity and strength is obtained without permitting the fluidity value to rise above about 10. The suspension is neutralized, the starch filtered, washed, and, if desired, dried. Generally, the starch or starch sulfate will be in ungelatinized form for convenience of operation but the treatment may also be applied to either in gelatinized form.

In applying the acid treatment to starch sulfate, it is advantageous to carry out the treatment in the presence of a salt, such as sodium sulfate, potassium sulfate, sodium chloride, sodium citrate, sodium tartrate, in order to better control the extent of acid hydrolysis of the carbohydrate molecule during the acid modification treatment.

The examples set forth below, which are intended as typical and informative only and not in a limiting sense, will further illustrate the invention. Unless otherwise specified, measurements of gel clarity, gel strength, fluidity, and viscosity were made as follows:

Gel clarity was measured, at 25° C., as the percent light transmission on an aqueous paste at a wave length of $\lambda = 640 m\mu$ and using a Coleman, Model 14, Spectrophotometer, with water as reference at 100 percent.

Gel strength was determined by a modification of the method given by Saare and Martens, in Zeitschrift für Spiritusindustrie, vol. 26, p. 436 (1903), as described by Kerr, in Chemistry and Industry of Starch, pages 135 to 137, using a disc of exactly 2 cm. diameter (1 cm. radius) and using a ratio of 40 grams per 280 ml. for all treated starch unless specified otherwise.

Fluidity was determined in accordance with the method described at page 133 of Chemistry and Industry of Starch, 2nd edition, by Kerr, and Scott viscosity as described at pages 119, 120 thereof.

EXAMPLE 1

*Production of a clear gel forming agent by sulfating corn starch and acid treating the starch sulfate*

1800 grams of corn starch was suspended in 1700 ml. of water plus 500 ml. of N NaOH, into which had been previously dissolved 220 grams of sodium sulfate. Then with stirring at about 45° C., 48.6 grams of trimethylamine sulfur trioxide was added and the reaction was allowed to proceed for 18 hours. After this reaction period, the reaction mixture was neutralized with sulfuric acid and a portion was removed which was filtered, thoroughly washed with water, refiltered and dried.

The balance was acidified with 2 N $H_2SO_4$ to pH 1.2 and stirred at about 47° C. At periodic intervals, samples were removed, neutralized with dilute sodium hydroxide to pH 6.5 to 7.0, filtered, thoroughly washed with water, refiltered and dried. The several products, all in unswollen granule form, were analyzed. The results are shown in Table I.

By analysis, the starch sulfate sample prior to the acid treatment showed 0.66 percent sulfur which is equivalent to a D.S. of 0.034 sulfate groups per anhydroglucose unit. The final sample after acid treatment showed 0.67 percent sulfur, showing that there had been substantially no hydrolysis of sulfate ester linkages during the treatment.

TABLE I.—PROPERTIES OF ACID TREATED STARCH SULFATES

| Sample No. | Acid Treat., Hr. | Intrinsic Viscosity in N KOH at 35° C. | Scott Viscosity | | Calcd. Fluidity | Gel Clarity as Percent L.T. | | Gel Strength, g./$\pi$ cm.$^2$ |
|---|---|---|---|---|---|---|---|---|
| | | | Grams per 280 ml. | Delivery | | 1% | 3% | |
| | | | | ml. | sec. | | | |
| 1 | 0 | 1.55 | 3 | 50 | 47 | 0.6 | 89 | 74 | 149 |
| 2 | 1 | | 3 | 50 | 40 | 0.8 | 92 | 75 | 136 |
| 3 | 2 | 1.55 | 3 | 50 | 34 | 2.5 | 91 | 76 | 120 |
| 4 | 3 | | 15 | 100 | 107 | 4.7 | 92 | 76 | 137 |
| 5 | 4 | 1.50 | 15 | 100 | 75 | 6.5 | 93 | 79 | 106 |
| 6 | 5 | | 15 | 100 | 60 | 8.5 | 92 | 82 | 122 |
| 7 | 6 | 1.30 | 15 | 100 | 59 | 8.6 | 92 | 80 | 113 |
| 8 | 7 | 1.25 | 15 | 100 | 53 | 9.5 | 92 | 80 | 110 |
| 9 | 24 | 0.85 | 15 | 100 | 31 | 19.0 | 93 | 83 | 62 |
| 10 | 72 | 0.56 | 50 | 100 | 37 | 75.0 | 94 | 84 | 15 |

Inasmuch as the gel clarity of the untreated corn starch used in this example was only 24 percent light transmission on a 1 percent paste and 10 percent light transmission on a 3 percent paste, it will be observed that even at low D.S. levels, gel clarity is very greatly improved by sulfation, the gel clarity at 1 percent concentration being 89 percent. As we approach more usable concentrations, e.g., 3 percent solid, some opacity of gel results.

and percent light transmission is now only 74 percent. However, gel clarity may be brought into the more acceptable range of 80 to 85 percent light transmission for better hydrogels, such as gelatin, pectin and refined agar, by an acid treatment of the starch sulfate and, surprisingly, in view of the behavior of other starch derivatives, without the gel strength falling below an acceptable level. Thus, for example, when the acid treatment was limited to 5 hours at 47° C., a product was obtained with a gel strength of about 120 and a gel clarity at 3 percent solids of 82 percent light transmission. Measurement of intrinsic viscosities of these products showed that this limited acid treatment brought about no significant change in the molecular weight of the product and that the surprising results obtained in this region of acid treatment are due to other effects of the acid, such as the establishment of hydrogen bonds between starch molecules, which more than offsets any adverse effect of the acid in reducing the carbohydrate molecular weight. It is not until the acid treatment is extended out to about 24 hours, in this case, that reduction in molecular weight began to show up and we have approached the range of viscosity of the "thin-boiling" starches of commerce. But here we have dropped below an acceptable gel strength range, and, moreover, we have not improved the gel clarity, additionally.

The unanticipated results obtained with this starch derivative followed by acid treatment are no doubt due to an as yet unexplained combination of effects on the starch using tertiary amine sulfur trioxide compounds and of acid treatment in aqueous media. For when corn starch was sulfated by other procedures, e.g., according to the method given in U.S. Patent 2,775,586 and the starch sulfate treated in dilute sulfuric acid in the same manner as is given herein above in Example 1, then relatively much more cloudy pastes resulted in all cases, and very much lesser gel strengths were obtained than are shown in Table I. In no case were paste clarities obtained in excess of 60 percent light transmission (for 3 percent solids concentration) when the acid treatment was limited to the level where the gel strength was 120 grams per $\pi$ cm.$^2$, or higher, using 40 grams of starch product per 280 ml. of water.

However, in using a combination of sulfation by means of tertiary amine sulfur trioxide and acid treatment, nearly as good results may be obtained by reversing the order of treatment and applying the acid treatment first. This is shown by the data presented in Example 2.

EXAMPLE 2

*Sulfation of acid modified starch*

600 grams of corn starch was suspended in 570 ml. of water and 2 N sulfuric acid was added to adjust the pH to 1.5. The starch slurry was stirred at 47° C. and aliquots were removed at 2, 4, 6, 18 and 24 hours. These samples were immediately adjusted to pH 6.5 with NaOH and filtered to give in each case a filter cake containing about 110 grams, dry basis, of acid treated starch. Each sample of cake was then resuspended in its own filtrate to which had been dissolved therein 66 grams of sodium sulfate and sufficient N sodium hydroxide solution to adjust the starch slurry to about pH 11. Each sample was then stirred at 47° C. and 14.6 grams of trimethylamine sulfur trioxide was added. After stirring at 47° C. for 18 hours, the samples were adjusted to pH 6.5 with $H_2SO_4$, filtered, thoroughly washed with water, refiltered and dried. All products were in the unswollen granule state. They were analyzed and the results are shown in Table II.

TABLE II.—PROPERTIES OF SULFATED, ACID-TREATED STARCH

| Sample No. | Acid Treat., hr. | Sulfur, Percent | Intrinsic Visc. | Scott Viscosity | | | Calcd. Fluidity | Gel Clarity as Percent L.T. | | Gel Strength, g./$\pi$ cm.$^2$ |
| | | | | g. per 280 ml. | Delivery | | | 1% | 3% | |
| | | | | | ml. | sec. | | | | |
| --- | --- | --- | --- | --- | --- | --- | --- | --- | --- | --- |
| 1 a | 0 | 0.66 | 1.55 | 3 | 50 | 47 | 0.6 | 89 | 74 | 149 |
| 2 | 2 | 0.71 | 1.55 | 15 | 50 | 62 | 2.5 | 91 | 83 | 144 |
| 3 | 4 | 0.69 | 1.50 | 15 | 100 | 97 | 5.3 | 91 | 83 | 136 |
| 4 | 6 | 0.65 | 1.39 | 15 | 100 | 64 | 8.0 | 92 | 86 | 114 |
| 5 | 18 | 0.64 | 1.04 | 15 | 100 | 35 | 17.0 | 93 | 86 | 78 |
| 6 | 24 | 0.66 | 0.90 | 28.35 | 100 | 41 | 49.0 | 94 | 94 | 69 | a Same as Sample No. 1, Table I.

From the results shown in Table II, it will be seen that treatment with acid for 6 hours followed by sulfation gave a product which made a gel with the unusually high clarity of 86 percent at a solids concentration of 3 percent with an acceptable gel strength of 114. Again it will be seen that by intrinsic viscosity measurements that there was very little reduction in molecular weight during the acid treatment.

Acid concentration, temperature and time are interrelated variables of the acid treatment for producing in combination with sulfation, a clear gelling agent. The higher the temperature and the higher the acid concentration, the shorter the time to arrive at the desired level of treatment, and the shorter the time, also to overtreat and produce a weak gelling agent. Accordingly, neither value should be so high that the action cannot be satisfactorily controlled. Also, neither should the acidity or temperature be so high that the starch granules are dissolved or gelatinized. On the other hand, the acid concentration and/or temperature should not be so low that the action requires impractical lengths of time. It has been found that acid concentrations represented by a range of pH 1.0 to 2.0 and temperatures between about 40 and 55° C. are practical operating limits for the acid treatment operation.

The degree of sulfation required to produce a clear gelling agent in combination with acid treatment from cereal starches, such as corn, grain sorghum, wheat, rice and the like, varies over a wide range. A degree of sulfation represented by about 0.02 as sulfate groups per anhydroglucose unit in the starch molecule is required to give a percentage clarity high enough so that by acid treatment, the clarity may be extended into the acceptable range of 80–85 percent, for 3 percent solids paste, before the gel strength has dropped below the acceptable level of about 100–1200. A degree of sulfation higher than about D.S. 0.10 produces exceptionally clear pastes, but they have gel strengths less than 100 before any acid treatment, whatsoever.

EXAMPLE 3

*Production of a clear gel forming agent by sulfating corn starch and acid treating the starch sulfate*

The following example illustrates the unanticipated action of acid in strong salt solution on corn starch sulfate (0.57 percent S) in producing a clear gel forming agent.

50 grams of sodium sulfate decahydrate $(Na_2SO_4 \cdot 10H_2O)$ was dissolved in 200 ml. of water and 180 grams (one molar weight) of corn starch at 10 percent moisture content was added with stirring to form a slurry. Then 10 grams (0.055 mole) of the crystalline triethylamine sulfur trioxide $(C_2H_5)_3N \cdot SO_3$, and 1.6 grams (0.04 mole) of NaOH as a N solution were added. The reaction mixture was stirred in a water bath at 40° C. The pH was 10.4. After 2 hours an additional 0.8 gram (0.02 mole) of NaOH was added as a N solution in water. After 6 hours the reaction mixture was neutralized by the addition of 2 N HCl and sufficient 2HCl was added to make the liquid phase 0.25 N with respect to the acid. The reaction mixture was stirred an additional 2 hours at 45° C., then adjusted to pH 7.5 with NaOH and filtered. The starch product was thoroughly washed with water, filtered and dried.

The dried starch sulfate contained 0.57 percent sulfur by Parr bomb analysis which represents a D.S. of 0.03. Nitrogen was 0.02 percent in the product, compared to 0.04 percent in the original starch.

When one part of the product was suspended in 10 parts of water and gelatinized by heating in a boiling water bath for 15 minutes, an extremely clear solution formed which had a viscosity greater than untreated corn starch and which set to a clear gelled mass on cooling. The gel clarity of the product as measured on a 1 percent aqueous paste was 92 percent light transmission and on a 3 percent paste, it was 80 percent. The gel strength was 130 grams per $\pi$ sq. cm. when 40 grams of product is cooked in 280 ml. of water and cooled. The fluidity value of the product was <1.

Similar gel forming starches have been prepared by procedures similar to those given above when as little as 0.03 mole of $(C_2H_5)_3N \cdot SO_3$ was employed per molar weight of starch and, or, when the acid treatment had been extended to as long as 7 hours at 40° C. Temperatures used in the acid treatment have been varied between 40° C. and 50° C.

These starch sulfate gels strongly resemble gels made from gelatin, pectin, or agar.

In this example sufficient alkali was employed to neutralize the $NaHSO_4$, formed by reagent hydrolysis, and to promote volatilization of the tertiary amine from the reagent, thus eliminating a major portion of the amine from the reaction mixture at this point. By sulfating starch in the presence of a salt, such as $Na_2SO_4$, the product is not only more readily filtered and washed because of suppression of starch granule swelling, but also, the residual trialkylammonium ion is replaced by the sodium ion. A further reduction of residual amine may be effected before acid modification, when desired, by washing the filter cake with a solution of $Na_2SO_4$.

EXAMPLE 4

*Preparation of a gelled, fruit-flavored dessert using acid treated starch sulfate*

A gelatin-like dessert was prepared from the product obtained according to Example 3 as follows: The following formulation,

| | Amount in grams |
|---|---|
| Acid treated starch sulfate | 13.50 |
| Dextrose, anhydrous | 7.06 |
| Sucrose | 28.57 |
| Salt (NaCl) | 0.21 |
| Tartaric acid | 0.60 |
| Artificial color and cherry flavor (Ponceau Dye-SX plus benzaldehyde) | 0.06 |
| Total | 50.00 | was stirred into a metal cup containing 185 ml. of water. The mixture was placed in a boiling water bath and stirred for 3 minutes. The clear, gelatinized mass was then poured into a glass mold to cool.

When cooled to room temperature, the product set to a clear, firm gel which retained the shape of the mold when inverted and released. The red, cherry-flavored gel strongly resembled a similarly flavored gelatin gel.

In the above formulation, the amount of starch product was varied from 10 to 20 grams with the result that gels of various consistencies, from soft to very firm setting, were obtained.

EXAMPLE 5

*Preparation of a gelled salad using acid treated starch sulfate*

The following ingredients

| | Grams |
|---|---|
| Acid treated starch sulfate (prepared by procedures given in Example 3) | 13 |
| Sucrose | 15 |
| Citric acid | 0.5 | were stirred into 200 ml. of water in a metal cup and stirred for 4 minutes in a boiling water bath. As the mass cooled, the following materials were stirred in:

| | Grams |
|---|---|
| Diced fruit (drained, fruit cocktail, Dole brand) | 85 |
| Shredded lettuce | 10 |
| Color (2 drops of 1% Guinea Green B, in water) | |

The blended mass was then poured into a glass mold to set. On standing at room temperature, a clear, green gelled salad was obtained which retained the shape of the mold when the latter was inverted and the gel released. The texture of the gel was comparable to similar products made with gelatin.

EXAMPLE 6

*Preparation of gelled bouillon using acid treated starch sulfate*

10 grams of acid treated starch sulfate, prepared by procedures outlined in Example 3, were stirred into 200 ml. of strained beef broth, in a metal cup. The mixture was cooked for 5 minutes, with stirring, in a boiling water bath. The cook was then cooled whereupon a clear, gelled bouillon resulted, quite comparable in appearance and texture to similar gelled bouillons, made with gelatin.

EXAMPLE 7

*Preparation of a pectin-like jelly using acid treated starch sulfate*

40 grams of acid treated starch sulfate, prepared by procedures outlined in Example 3, were stirred into 300 ml. of water and the mixture stirred in a metal cup that was immersed in a boiling water bath, for 10 minutes. At this time, 75 grams of sucrose was stirred into the paste and cooking was continued for an additional 10 minutes. As the mass cooled, 2 grams of tartaric acid, 0.4 gram of sodium benzoate and artificial grape flavor and color were stirred in after which the cooked gel was poured into a glass jar to cool.

A sparkling clear, firm jelly resulted with a texture and appearance strikingly similar to conventional grape, pectin jelly.

EXAMPLE 8

*Acid treatment of starch sulfated with trimethylamine sulfur trioxide to produce a clear gelling agent*

180 grams of commercial corn starch at 10 percent moisture (one molar weight) was stirred into 220 ml. of water into which had been dissolved 22 grams of sodium sulfate (anhydrous) and 0.8 gram (0.2 mole) of sodium hydroxide. To this starch slurry at 40° C. was added with vigorous stirring, a total of 4.63 grams (0.033 mole) of crystalline trimethylamine sulfur trioxide in small increments. The reaction mixture was held at 40° C. with stirring and after one hour an additional 0.8 gram (0.02 mole) of sodium hydroxide (dissolved in 20 ml. of water) was added dropwise. After 5 hours at 40° C., the mixture was cooled to room temperature. The pH was 9.6. The mixture was adjusted to pH 7.0 by the addition of 4.4 ml. of normal hydrochloric acid.

After neutralization of the reaction mixture, the starch slurry was not filtered. Instead, an additional amount of hydrochloric acid was added (33 ml. of 2 N HCl) sufficient to adjust the aqueous phase to 0.25 normal acid. The acidified mixture was held with stirring at 40° C for 2 hours whereupon it was neutralized with sodium hydroxide, filtered, thoroughly washed with water, filtered, and dried.

Yield was 181 grams at 10.35 percent moisture or 162.3 grams, dry basis, from 162 grams, dry basis, corn starch. The product contained 0.556 percent sulfur, dry basis, by Parr bomb method; the D.S. is 0.03 as sulfate ester groups.

The Scott viscosity of this product was 451 seconds/100 ml. using 12 grams at 12 percent moisture in 280 ml. of water. For comparison, a similar Scott viscosity test on the untreated corn starch was only 70 seconds/100 ml.

Clarity of a 1 percent paste was now increased to 92 percent at a paste pH of 6.2 and a 3.5 percent paste set to clear, firm gel on cooling. The clarity of a 3 percent paste was 82 percent. For comparison, the clarity of a one percent paste of untreated starch was only 24 percent. The gel strength of the product was 135 grams per $\pi$ cm.$^2$. The fluidity value of the product was <1.

EXAMPLE 9

*Sulfation of starch followed by acid modification*

180 grams of raw starch at 10 percent moisture was slurried into 260 ml. of water containing 19 grams (0.05 mole) of trisodium phosphate 12H$_2$O. To this was added 8 grams (0.044 mole) of triethylamine sulfur trioxide. The reaction mixture was heated to and held at 40° C. for 5 hours. The mixture containing the starch sulfate was neutralized to a pH of 7 with hydrochloric acid. The D.S. of the starch sulfate obtained was 0.036. The acid modified product had the following characteristics: The fluidity of the product was 5 based on Scott viscosity measurement as previously described. A 10 percent paste of the product set to a clear, firm gel after cooking and cooling. A 5 percent paste similarly treated set to a less firm but clearer gel. The gel clarity was 94 percent on a 1 percent paste and 86 percent on a 3 percent paste. The gel strength was 110 grams per $\pi$ cm$^2$. The fluidity value of the product was 5.

EXAMPLE 10

*Acid treatment of starch sulfated with crystalline N,N-dimethyl benzylamine sulfur trioxide in aqueous alkali*

180 grams of commercial corn starch at 11.47 percent moisture content was suspended in 220 ml. of water into which had been dissolved 22 grams of sodium sulfate and 0.02 mole sodium hydroxide. At 45° C. 7.08 grams of crystalline, N,N-dimethyl benzylamine sulfur trioxide was added in small increments with stirring, meanwhile adding dropwise 30 ml (0.03 mole) of N sodium hydroxide. The pH was 10.2.

The sulfating agent was prepared by adding dropwise, 17.4 grams of chlorosulfonic acid to a chilled solution of 40 grams of N,N-dimethyl benzylamine in 200 ml. of carbon tetrachloride with vigorous stirring. After one hour, the white crystalline precipitate was filtered on a sintered glass funnel with suction, washed with two 100 ml. portions of carbon tetrachloride and 50 ml. of petroleum ether and then dried.

After 5 hours reaction time at 45° C., the sulfated starch was filtered by suction and washed on the filter with two 400 ml. portions of water to remove salts and other by-products. The starch sulfate was resuspended in 240 ml. of water and the slurry, which was now pH 9.8, was adjusted to pH 2.0 by the addition of 8.4 ml. of 2 N hydrochloric acid. The reaction mixture was stirred for 2 hours at 45° C, filtered and washed on the filter with two 400 ml. portions of water. The filter cake was resuspended in 400 ml. of water, adjusted to pH 7.5 with dilute sodium hydroxide and filtered. The acid treated starch sulfate was washed on the filter with two 200 ml. portions of water and air dried. The yield was 174 grams at 9.07 percent moisture content. Sulfur content was 0.429 percent, dry basis, corresponding to a D.S. 0.022.

The Scott viscosity of the product, using 10.56 grams dry basis (or 12 grams at 12 percent moisture) in 280 ml. of water, was 42 seconds per 100 ml. The clear sol from this test, at pH 5.9, set to a clear, firm gel when cooled to room temperature, retaining the shape of the mold, when released therefrom.

The gel clarity of a 1 percent paste of the product was 91 percent and a 3 percent paste 80 percent. The gel strength was 127 grams per $\pi$ cm.$^2$. The fluidity value of the product was 4.

EXAMPLE 11

*Acid treatment of starch, sulfated with crystalline pyridine sulfur trioxide in aqueous alkali*

180 grams of commercial corn starch, at 11.47 percent moisture content, was suspended in 220 ml. of water, into which had been dissolved 22 grams of sodium sulfate and 0.02 mole of sodium hydroxide. At 45° C., 9 grams of crystalline pyridine sulfur trioxide was added in small portions, with stirring, meanwhile adding dropwise, 120 ml. of N sodium hydroxide (0.12 mole). The pH was 11.1.

The sulfating agent was prepared by adding to 11.85 grams of analytical reagent grade pyridine, dissolved in 100 ml. of chilled chloroform, 5.80 grams of chlorosulfonic acid dissolved in 25 ml. of chloroform with vigorous stirring. After 15 hours in a cooling bath, the white crystalline precipitate was filtered on a sintered glass funnel with suction, washed on the filter with two 25 ml. portions of cold chloroform and 25 ml. of petroleum ether and dried.

After 5 hours sulfation time at 45° C., the sulfated starch slurry, without purification to remove salts, was neutralized and then an additional quantity of hydrochloric acid was added to make the water phase 0.25 N with respect to the acid.

The acidified mixture was stirred for 2.5 hours at 45° C. and then filtered with suction. The acid treated, sulfated starch filter cake was washed on the filter with two 400 ml. portions of water. The washed cake was taken up in 600 ml. of water, adjusted to pH 7.5 with dilute sodium hydroxide and refiltered. The filter cake was washed with two 200 ml. portions of water and then air dried.

Yield of acid treated starch sulfate was 177.0 grams at 9.57 percent moisture. Sulfur content was 0.440 percent, dry basis, corresponding to a D.S. of 0.023.

The Scott viscosity of the product, using 10.56 grams, dry basis (or 12 grams at 12 percent moisture) in 280 ml. of water, was 308 seconds per 100 ml. The clear sol from this test, at pH 5.8, set to a clear, firm gel when cooled to room temperature, retaining the shape of the mold, when released therefrom.

The gel clarity of a 1 percent paste was 90 percent and a 3 percent paste 80 percent. The gel strength was 126 grams per $\pi$ cm.$^2$. The fluidity value of the product was <1.

This application is a continuation-in-part of application Serial No. 572,619, filed March 20, 1956, which is a continuation-in-part of application Serial No. 492,778, filed March 7, 1955, now abandoned.

We claim:

1. A process for preparing a starch product which will form a clear, moldable gel having a gel strength of at least 100 grams per $\pi$ sq. cm. at a concentration of 40 grams of starch product per 280 ml. of water which comprises acid treating and sulfating cereal starch in any order and recovering the starch product; the extent of the acid treatment being sufficient to increase the clarity of a 3 percent paste to 80–85 percent of light transmission, the product maintaining a fluidity range not above about 10; the degree of sulfation being within the range of 0.02 to 0.10 D.S.; the sulfation being carried out by reacting in an aqueous system the starch and a tertiary amine sulfur trioxide compound at a pH between 7 and about 11; the amount of tertiary amine sulfur trioxide compound being about 0.02 to 0.10 mole per anhydroglucose unit, dry basis; said acid treatment being carried out by treating the starch in an aqueous medium having a pH of about 1.0 to 2.5 at a temperature of about 40° C. to about 55° C. for about 2 to about 10 hours; and recovering the resultant acid treated starch sulfate.

2. A process according to claim 1 wherein said sulfating compound is trimethylamine sulfur trioxide.

3. A process according to claim 1 wherein said sulfating compound is triethylamine sulfur trioxide.

4. A process according to claim 1 wherein said sulfating compound is pyridine sulfur trioxide.

5. A process according to claim 1 wherein said sulfating compound is N,N-dimethyl benzylamine sulfur trioxide.

6. A process according to claim 1 wherein the sulfation reaction is carried out in the presence of a salt which inhibits gelatinization; said salt being removed after the sulfation reaction is complete.

7. A process according to claim 1 wherein the acid treatment is carried out in the presence of a water-soluble alkali metal salt.

References Cited in the file of this patent

UNITED STATES PATENTS

| | | |
|---|---|---|
| 2,554,143 | Hinz et al. | May 22, 1951 |
| 2,686,779 | Jones | Aug. 17, 1954 |
| 2,697,093 | Jones | Dec. 14, 1954 |
| 2,775,586 | Paschall | Dec. 25, 1956 |
| 2,786,833 | Wurzburg et al. | Mar. 26, 1957 |
| 2,801,923 | Stoloff | Aug. 6, 1957 |